E. A. HILDING.
AIR VALVE FOR PNEUMATIC TIRES FOR BICYCLES OR THE LIKE.
APPLICATION FILED AUG. 11, 1915.

1,237,041.

Patented Aug. 14, 1917.

INVENTOR:
Ernst Alfred Hilding
BY Wm Wallace White
ATT'Y.

UNITED STATES PATENT OFFICE.

ERNST ALFRED HILDING, OF LIDKÖPING, SWEDEN.

AIR-VALVE FOR PNEUMATIC TIRES FOR BICYCLES OR THE LIKE.

1,237,041.     Specification of Letters Patent.    Patented Aug. 14, 1917.

Application filed August 11, 1915. Serial No. 44,873.

*To all whom it may concern:*

Be it known that I, ERNST ALFRED HILDING, subject of the King of Sweden, residing at Lidköping, in the county of Skaraborg and Kingdom of Sweden, have invented new and useful Improvements in Air-Valves for Pneumatic Tires for Bicycles or the like, of which the following is a specification.

This invention relates to improvements in air valves for pneumatic tires for bicycles or the like and has for its object to provide a useful and reliable device which combines these features with a considerably cheaper cost of manufacture.

The invention is illustrated in the annexed drawing where the improved device is shown in approximately double the natural size.

Figure 1:
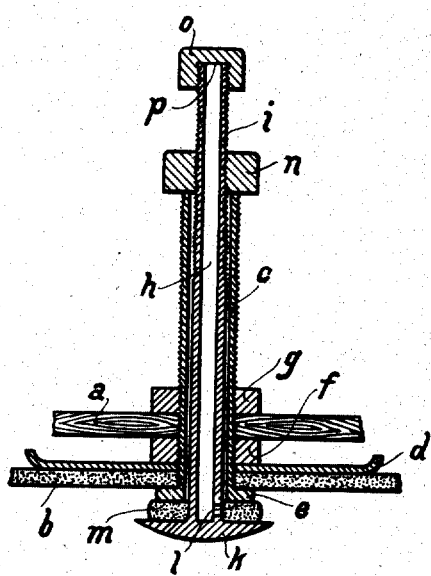

Figure 1 is a longitudinal section of the air valve when in use.

Figure 2:
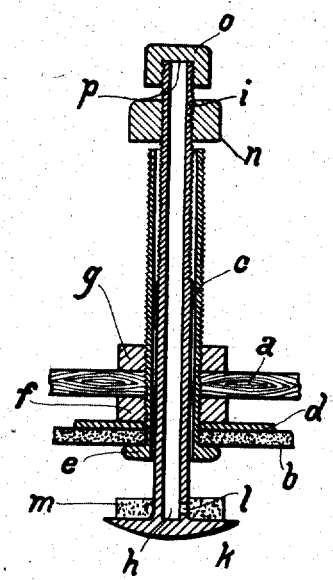

Fig. 2 the same view showing the valve opened up to release the air pressure from the interior of the tire.

Figure 3:
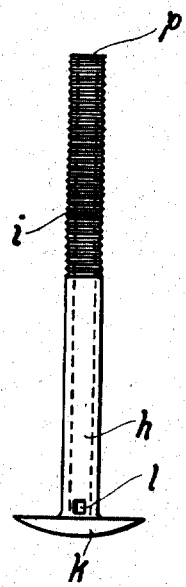

Fig. 3 a side elevation of the internal supply pipe.

$a$ is the wheel rim, $b$ the wall of the pneumatic tire, $c$ the outer sleeve or body of the valve, fastened to the tire in the usual way by means of a plate $d$, a flange $e$ and nuts $f$ and $g$ screwed tight on the screwthreaded outside of the pipe $c$. Inside of the pipe $c$ there is the usual inner- or air-supply pipe $h$, the construction of which, however, differs materially from those hitherto found in connection with devices of the class in question. The pipe $h$ consists of a plain shaft screwthreaded on the outermost portion $i$ and provided at the inner or rear end with a flanged head $k$.

The central boring of the supply pipe $h$ is open at the outer end $p$ and closed at the inner end, where it communicates with the inside of the tire $b$ by a small transversely directed orifice $l$, situated between the head $k$ and the flange $e$ when the valve is in place. Under the same circumstances the orifice $l$ is closed by a washer $m$ of india rubber or some other soft and elastic material, which fills up the space between the head $k$ and the flange $e$. By a nut $n$ screwed outside the pipe shaft $h$ and bearing against the free end of the body $c$ the inner pipe $h$ may be drawn outward thereby compressing the elastic washer $m$ between the head $k$ and flange $e$ and thus tightly closing the little hole $l$ so that the communication from the tire $b$ is cut off and the escape of the air in the tube prohibited. The mouth of the pipe $h$ may be closed in the usual way by a screw cap $o$ or the like.

When filling up the tire $b$ with compressed air, the pump is connected to the end $p$ of the pipe $h$ in the usual manner after removing the cap $o$, and the air under high pressure imparted to it from the pump plunger causes the elastic washer $m$ to deflect enough so that the air can penetrate the orifice $l$ and enter the tire therethrough. Should it be necessary to blow off the air from the tire, the nut $n$ is screwed outward a little and the inner pipe $h$ pushed inward, carrying with it the washer $m$, as illustrated in Fig. 2, in which position there is room for the air to escape through the space between the inner pipe $h$ and outer sleeve $c$.

The device is rather cheap to manufacture as it does away with the cones hitherto used in connection with air valves of the class in question, and it is quite as cheap and easy in handling on account of the absence of the always troublesome rubber tube and its replacing by the very simple washer $m$.

Having thus described my said invention and how it is to be performed, what I claim as new and want to protect by Letters Patent is:

1. An air check valve for pneumatic tires comprising an outer sleeve attached to and extending within the tire and provided with a flange at its inner end having a plain inner surface, an air supply pipe longitudinally movable within the outer sleeve, said supply pipe being closed at its inner end by a flanged head and provided with a transverse orifice adjacent to the flanged head, an elastic washer placed about said supply pipe between the said flanges, covering said orifice, and adapted to expand radially, and means for compressing said washer axially.

2. An air check valve for pneumatic tires comprising an outer sleeve attached to and extending within the tire and provided with a flange at its inner end having a plain inner surface, an air supply pipe screwthreaded at its outer end and longitudinally movable within the outer sleeve, said supply pipe being closed at its inner end by a flanged head and provided with a transverse orifice adjacent to the flanged head, an elastic washer placed about said supply pipe between the said flanges, covering said orifice, and adapted to expand radially, and a nut screwed upon said supply pipe and adapted to bear against the outer end of said outer sleeve to adjust the compression on said washer as set forth.

In testimony whereof I have hereunto set my hand in presence of two subscribing witnesses.

ERNST ALFRED HILDING.

Witnesses:
G. BRATHHORN,
E. HJORTHAN.